United States Patent
He et al.

(10) Patent No.: US 12,250,073 B2
(45) Date of Patent: Mar. 11, 2025

(54) INSTRUCTION ENCODING-BASED DATA PROCESSING METHOD AND APPARATUS, AND DEVICE

(71) Applicants: CHINA NATIONAL DIGITAL SWITCHING SYSTEM ENGINEERING & TECHNOLOGICAL R&D CENTER, Henan (CN); ZHUHAI COMLEADER INFORMATION SCIENCE & TECHNOLOGY CORP., LTD., Guangdong (CN)

(72) Inventors: Lei He, Henan (CN); Jiangxing Wu, Henan (CN); Quan Ren, Henan (CN); Zhen Zhang, Henan (CN); Weitao Han, Henan (CN); Fengyu Zhang, Henan (CN); Zheng Yuan, Henan (CN); Yiwei Guo, Guangdong (CN); Zhifeng Feng, Guangdong (CN)

(*) Notice: Subject to any disclaimer, the term of this patent is extended or adjusted under 35 U.S.C. 154(b) by 0 days.

(21) Appl. No.: 18/264,730

(22) PCT Filed: Jun. 7, 2021

(86) PCT No.: PCT/CN2021/098599
§ 371 (c)(1),
(2) Date: Aug. 8, 2023

(87) PCT Pub. No.: WO2022/170710
PCT Pub. Date: Aug. 18, 2022

(65) Prior Publication Data
US 2024/0113809 A1    Apr. 4, 2024

(30) Foreign Application Priority Data
Feb. 9, 2021 (CN) .......................... 202110176515.7

(51) Int. Cl.
| H04L 1/00 | (2006.01) |
| G06F 11/00 | (2006.01) |
| H04L 1/22 | (2006.01) |

(52) U.S. Cl.
CPC ............ *H04L 1/0061* (2013.01); *G06F 11/00* (2013.01); *H04L 1/0009* (2013.01); *H04L 1/0041* (2013.01); *H04L 1/22* (2013.01)

(58) Field of Classification Search
CPC ..... H04L 1/0061; H04L 1/22; H04L 2209/12; H04L 2209/34; H04L 1/0009; H04L 1/0041; G06F 11/00
See application file for complete search history.

(56) References Cited

U.S. PATENT DOCUMENTS

| 10,070,327 B2 * | 9/2018 | Yang ..................... H04L 1/0078 |
| 10,296,913 B1 | 5/2019 | Breitman |

(Continued)

FOREIGN PATENT DOCUMENTS

| CN | 101090306 A | 12/2007 |
| CN | 103369703 A | 10/2013 |

(Continued)

OTHER PUBLICATIONS

International Search Report and Written Opinion issued in PCT/CN2021/098599, dated Oct. 21, 2021; 9 pages including English translation.

(Continued)

*Primary Examiner* — Cynthia Britt
(74) *Attorney, Agent, or Firm* — Schwabe, Williamson & Wyatt, P.C.

(57) ABSTRACT

The present application provides an instruction encoding-based data processing method and apparatus, and a device. N-path error correction encoding is performed on an instruction in information to be processed to obtain N encoded (Continued)

instructions, the encoded instructions and encoded meta channel programs obtained by the error correction encoding are used to perform redundant processing on data to be processed to obtain N pieces of response data, and then error correction decoding is performed on the N pieces of response data to obtain processing result information of the information to be processed. Because the N encoded instructions are heterogeneous and the encoded meta channel programs used in the N-path processing are heterogeneous, the randomness of the processing process can be improved, generalized disturbance in the data processing process can be corrected in combination with the error correction encoding and decoding methods, and thus the security of data processing is improved.

13 Claims, 4 Drawing Sheets

(56) References Cited

U.S. PATENT DOCUMENTS

| | | | |
|---|---|---|---|
| 10,700,813 B2 | 6/2020 | Nammi | |
| 2006/0156185 A1 | 7/2006 | Zhang | |
| 2009/0049073 A1 | 2/2009 | Cho | |
| 2010/0122105 A1* | 5/2010 | Arslan | G06F 30/3308 |
| | | | 712/E9.016 |
| 2011/0302583 A1 | 12/2011 | Abadi | |
| 2011/0320864 A1 | 12/2011 | Gower | |
| 2012/0089884 A1 | 4/2012 | Kamiya | |
| 2013/0294225 A1 | 11/2013 | Zhang | |
| 2018/0270015 A1* | 9/2018 | Yokokawa | G06F 13/42 |
| 2020/0336244 A1 | 10/2020 | Shokrollahi | |
| 2023/0033253 A1 | 2/2023 | He | |
| 2023/0039521 A1 | 2/2023 | He | |
| 2024/0113809 A1 | 4/2024 | He | |
| 2024/0121029 A1 | 4/2024 | He | |

FOREIGN PATENT DOCUMENTS

| | | |
|---|---|---|
| CN | 106850188 A | 6/2017 |
| CN | 110162983 A | 8/2019 |
| CN | 111339071 A | 6/2020 |
| CN | 111769903 A | 10/2020 |
| CN | 112217604 A | 1/2021 |
| CN | 112217778 A | 1/2021 |
| WO | 2010/073922 A1 | 7/2010 |

OTHER PUBLICATIONS

Hailong, "Dynamic Heterogeneous Redundancy Based Router Architecture with Mimic Defenses" Journal of Cyber Security, vol. 2, No. 1, Jan. 31, 2017, chapters 2-3 (14 pages).

Wang, "Modelization and Analysis of Dynamic Heterogeneous Redundant System" Concurrency and Computation: Practice and Experience, Oct. 13, 2020, 16 pages.

Ying, "Improvement on Transmission Mechanism of Dynamic Forward Error Correction Code" Journal of Southern Yangtze (Natural Science Edition), vol. 5, No. 2, Apr. 2006; 5 pages.

Bin, "A Transformation Principle of Regenerated Code for Heterogeneous Distributed Storage" Modern Electronics Technique, vol. 42, No. 24, Dec. 2019; 4 pages.

Jianping, "Research on the physical layer security in multihop wireless networks: A Dissertation submitted for the degree of Doctor of Philosophy" South China University of Technology, Guangzhou, CN, 111 pages including English Abstract.

Ji-Yan et al., "A Novel Joint Source-Channel Coding Scheme for Mobile Video Delivery in Heterogeneous Wireless Networks" Chinese Journal of Computers, vol. 37, No. 22 (2014); 16 pages.

Koca, et al. "Turbo Decoding of Multiple Description Source and Channel Codes" IEEE (2004); pp. 176-179.

* cited by examiner

INSTRUCTION ENCODING-BASED DATA PROCESSING METHOD AND APPARATUS, AND DEVICE

CROSS-REFERENCE TO RELATED APPLICATION

The present application is a national phase entry under 35 U.S.C. § 371 of International Application No. PCT/CN2021/098599, filed Jun. 7, 2021, which designates the United States of America, which claims priority to Chinese Patent Application No. 202110176515.7, titled "INSTRUCTION ENCODING-BASED DATA PROCESSING METHOD AND APPARATUS, AND DEVICE", filed on Feb. 9, 2021 with the China National Intellectual Property Administration, the entire disclosures of each of these applications are hereby incorporated by reference in their entireties and for all purposes.

FIELD

The present disclosure relates to the field of information processing, and in particular, to a data processing method, apparatus and device based on instruction encoding.

BACKGROUND

Information and communication network technology is developing rapidly. Currently, encryption is used as a protection scheme mostly to ensure the integrity and privacy of information during transmission and processing. Due to the inevitable occurrence of security problems in an information system, the way of encrypting data with a single key cannot guarantee that information will not be tampered with and stolen during transmission and processing. In other words, the existing communication system cannot correct generalized disturbances.

SUMMARY

The present disclosure provides a data processing method, apparatus and device based on instruction encoding, with the purpose of solving the problem of how to correct generalized disturbances.

To achieve the above objective, following technical solutions are provided by the present disclosure.

A data processing method based on instruction encoding includes:
receiving to-be-processed information, where the to-be-processed information includes an instruction and to-be-processed data;
performing N-channel error correction encoding on the instruction in the to-be-processed information, to obtain N heterogeneous encoded instructions, where N is an integer greater than or equal to 2;
performing N-channel redundancy processing on the to-be-processed data in the to-be-processed information according to the N heterogeneous encoded instructions, to obtain N channels of response data; where a processing flow of any channel of the N-channel redundancy processing includes: processing the to-be-processed data in the to-be-processed information according to an encoded meta-channel program and an encoded instruction matching the encoded meta-channel program, where the encoded meta-channel program is generated by performing an error correction encoding on a pre-configured meta-channel program, pre-configured meta-channel programs for the N-channel redundancy processing implement a same function, and encoded meta-channel programs for the N-channel redundancy processing are heterogeneous; and
performing an error correction decoding on the N channels of response data, to obtain a processing result for the to-be-processed information.

Optionally, before performing N-channel error correction encoding on the instruction in the to-be-processed information, the method further includes:
perform an error correction encoding on a pre-configured meta-channel program for an i-th channel of the redundancy processing, to obtain an encoded meta-channel program for the i-th channel, where $i=1, 2 \ldots N$; and
where performing N-channel error correction encoding on the instruction in the to-be-processed information includes:
performing the error correction encoding on the instruction in the to-be-processed information with a scheme same as that performed to obtain the encoded meta-channel program for the i-th channel, to obtain an encoded instruction for the i-th channel, where the encoded instruction for the i-th channel matches the encoded meta-channel program for the i-th channel.

Optionally, the performing N-channel error correction encoding on the instruction in the to-be-processed information, to obtain N heterogeneous encoded instructions includes:
performing the N-channel error correction encoding on the instruction in the to-be-processed information without changing semantics, to obtain N semantically unchanged heterogeneous encoded instructions, where the encoded meta-channel program has same semantics as the meta-channel program.

Optionally the N heterogeneous encoded instructions include:
N encoded instructions having contents with at least one of: signature diversity, tag diversity verification diversity, encryption diversity, scrambling diversity, compression diversity, transformation diversity, compilation diversity, instruction random tag diversity and instruction set randomization; and/or
N encoded instructions having instruction sequences with at least one of: randomization of a position of an instruction for realizing dynamically heterogeneous redundancy of a meta-channel operation sequence, randomization of a position of a block-level instruction, basic block diversity, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

Optionally, heterogeneity of the N encoded meta-channel programs for the N-channel redundancy processing includes:
contents of the N encoded meta-channel programs for the N-channel redundancy processing satisfying at least one of: signature diversity, tag diversity, verification diversity, encryption diversity, scrambling diversity, compression diversity, transformation diversity, compilation diversity, instruction random tag diversity, and instruction set randomization; and/or
instruction sequences of the N encoded meta-channel programs for the N-channel redundancy processing satisfying at least one of: randomization of a position of an instruction for realizing dynamically heterogeneous redundancy of a meta-channel operation sequence, basic block diversity, randomization of a position of a block-level instruction, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

Optionally, N is a dynamic value,
where the method further includes:
updating a value of N according to error information in performing the error correction decoding.

Optionally, the N heterogeneous encoded instructions are N dynamically heterogeneous encoded instructions;
the N encoded meta-channel programs for the N-channel redundancy processing are dynamically heterogeneous; and
the method further comprises: updating a scheme of random encoding according to error information in performing the error correction decoding.

Optionally, the performing an error correction decoding on the N channels of response data, to obtain a processing result for the to-be-processed information includes:
decoding the N channels of response data with a scheme corresponding to a scheme of the error correction encoding, to obtain the N channels of data to be determined; and
performing an error correction determination process on the N channels of data to be determined, to obtain the processing result.

A data processing apparatus based on instruction encoding, includes:
a structure encoding module configured to: receive to-be-processed information, where the to-be-processed information includes an instruction and to-be-processed data; and perform N-channel error correction encoding on the instruction in the to-be-processed information, to obtain N heterogeneous encoded instructions, where N is an integer greater than or equal to 2;
encoded channels configured to: perform N-channel redundancy processing on the to-be-processed data in the to-be-processed information according to the N heterogeneous encoded instructions, to obtain N channels of response data; where a processing flow of any channel of the N-channel redundancy processing includes: processing the to-be-processed data in the to-be-processed information according to an encoded meta-channel program and an encoded instruction matching the encoded meta-channel program, where the encoded meta-channel program is generated by performing an error correction encoding on a pre-configured meta-channel program, pre-configured meta-channel programs for the N-channel redundancy processing implement the same function, and encoded meta-channel programs for the N-channel redundancy processing are heterogeneous; and
an error correction decoding module, configured to: perform an error correction decoding on the N channels of response data, to obtain a processing result for the to-be-processed information.

An electronic device includes a memory and a processor, where the memory is stored with a program, and the processor is configured to run the program to implement the foregoing data processing method based on instruction encoding.

A computer-readable storage medium having a program stored thereon, where the program, when being executed by an electronic device, implements the foregoing data processing method based on instruction encoding.

According to the data processing method, apparatus and device based on instruction encoding provided in the present disclosure, N-channel error correction encoding is performed on the instruction in the to-be-processed information, to obtain N heterogeneous encoded instructions. Then redundancy processing is performed on the to-be-processed data by using encoded instructions and encoded meta-channel programs subjected to error correction encoding, to obtain N channels of response data. An error correction decoding is performed on the N channels of response data, to obtain a processing result for the to-be-processed information. Since the N encoded instructions are heterogeneous, and the encoded meta-channel programs for the N-channel processing are heterogeneous, the randomness of the processing is increased. Furthermore, the error correction encoding and decoding can correct generalized disturbances in the data processing, improving the security of data processing.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described in the following illustrate some embodiments of the present disclosure; other drawings may be obtained by those ordinarily skilled in the art based on these drawings without any creative efforts.

DETAILED DESCRIPTION

The technical solutions in the embodiments of the present disclosure will be described clearly and completely hereinafter in conjunction with the drawings of the embodiments of the present disclosure. Apparently, the described embodiments are only some of the embodiments of the present disclosure, rather than all embodiments. Any of other embodiments made by the person skilled in the art based on the embodiments in the present disclosure without any creative efforts, fall into the scope of the present disclosure.

Figure 1:
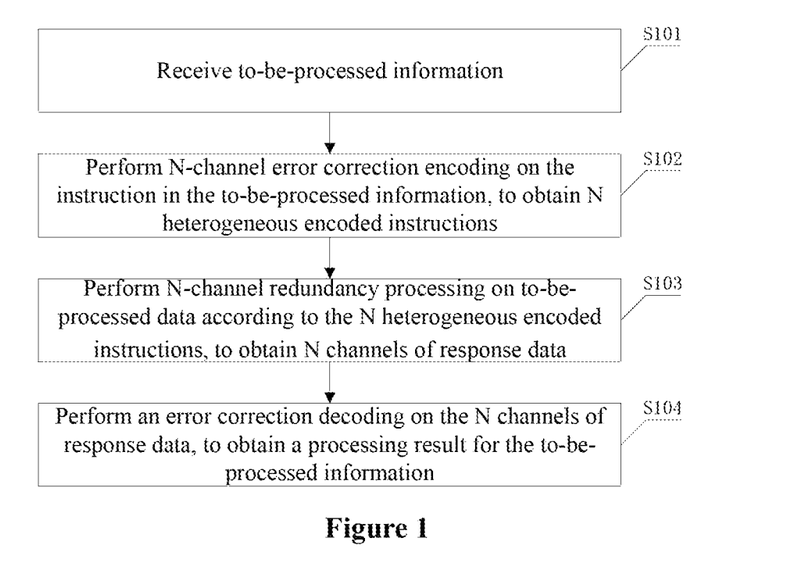
FIG. 1 is a flow chart of a data processing method based on instruction encoding according to an embodiment of the present disclosure.

FIG. 1 is a flow chart of a data processing method based on instruction encoding according to an embodiment of the present disclosure. The data processing method based on instruction encoding includes following steps S101 to S104.

In step S101, to-be-processed information is received. The to-be-processed information includes an instruction and to-be-processed data.

In step S102, N-channel error correction encoding is performed on the instruction in the to-be-processed information, to obtain N heterogeneous encoded instructions.

N is an integer greater than or equal to 2. Optionally, N may be an integer greater than 2 to improve the accuracy of error correction. Further, the larger N is, the stronger the error correction capability is, but the hardware and software costs are also higher, so N may be 3. In practice, a specific value of N may be configured as required, which is not limited in the present disclosure.

It is understandable that the term "heterogeneous" may be simply understood as "different". Heterogeneous error correction encoding schemes may be used to obtain the N heterogeneous encoded instructions from the instruction in the to-be-processed information.

Specifically the error correction encoding may include, but is not limited to: an error correction encoding performed on content(s) of the instruction(s) and an error correction encoding performed on a sequence of instructions. Thus the heterogeneous error correction encoding schemes may be realized.

Optionally the N heterogeneous encoded instructions include: N encoded instructions with heterogeneous contents, N encoded instructions with heterogeneous sequences, or N encoded instructions with heterogeneous contents and heterogeneous sequences.

Specifically, the N heterogeneous encoded instructions may have contents with at least one of the following: signature diversity tag diversity, verification diversity encryption diversity, scrambling diversity, compression diversity, transformation diversity, compilation diversity, instruction random tag diversity, and instruction set randomization.

The N heterogeneous encoded instructions may have a sequence with at least one of the following: randomization of a position of an instruction for realizing dynamically heterogeneous redundancy of a meta-channel operation sequence, randomization of a position of a block-level instruction, basic block diversity, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

Optionally, for the heterogeneity of the error correction encoding schemes, N kinds of existing heterogeneous error correction encoding schemes may be used for performing the N-channel error correction encoding on the instruction in the to-be-processed information. Alternatively, it is also possible to customize N kinds of heterogeneous error correction encoding schemes for the N-channel error correction encoding on the instruction in the to-be-processed information, as long as the N heterogeneous encoded instructions can be obtained, which is not limited in this embodiment.

In step S103, N-channel redundancy processing is performed, according to the N heterogeneous encoded instructions, on the to-be-processed data, to obtain N channels of response data.

It is understandable that redundancy processing means that the processing in all N channels implements the same function, for example, the function of cleaning the to-be-processed data.

Similar to the heterogeneity of the encoded instructions, the heterogeneity of encoded meta-channel programs used in the N-channel redundancy processing includes:

contents of the N encoded meta-channel programs used in the N-channel redundancy processing satisfying at least one of: signature diversity, tag diversity verification diversity, encryption diversity, scrambling diversity, compression diversity, transformation diversity, compilation diversity, instruction random tag diversity and instruction set randomization; and/or instruction sequences of the N encoded meta-channel programs used in the N-channel redundancy processing satisfying at least one of randomization of a position of an instruction for realizing dynamically heterogeneous redundancy of a meta-channel operation sequence, basic block diversity, randomization of a position of a block-level instruction, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

In this embodiment, a processing flow of any one of the N-channel redundancy processing includes: processing the to-be-processed data with the encoded meta-channel program and a matching encoded instruction, where the encoded meta-channel program is generated by performing an error correction encoding on a pre-configured meta-channel program. Encoded meta-channel programs used in the N-channel redundancy processing are heterogeneous. In other words, N heterogeneous encoded meta-channel programs are used to process the to-be-processed data for a same purpose.

It is understandable that the step S103 can be implemented by N redundant meta-channels, where the N redundant meta-channels implement the same function, each meta-channel is pre-configured with meta-channel data and a meta-channel program, and the meta-channel data and meta-channel program are configured to realize the function of the meta-channel.

Specifically the meta-channel data may include, but is not limited to: configuration data, storage data, and intermediate data for realizing the function of the meta-channel. The intermediate data refers to data used in a process of realizing the function of the meta-channel. The storage data refers to data for a storage operation in the process of realizing the function of the meta-channel.

In this embodiment, the error correction encoding is performed on the meta-channel programs. It is understandable that meta-channel programs of the N meta-channels may be the same or heterogeneous, but encoded meta-channel programs of the N meta-channels after the error correction encoding are heterogeneous. The way to implement the heterogeneity of the error correction encoding is as previously described.

In step S104, an error correction decoding is performed on the N channels of response data, to obtain a processing result for the to-be-processed information.

Specifically, S104 may be implemented with any manner known in the art. For example, a decoding scheme corresponding to the error correction encoding scheme is used to decode the N channels of response data, to obtain N channels of data to be determined; and an error correction determination process is performed on the N channels of data to be determined, to obtain the processing result.

According to the method as shown in FIG. 1, the error correction encoding is performed on both the instruction in the to-be-processed information and the meta-channel programs, thus the randomness in processing the to-be-processed data with the encoded meta-channel programs is increased. Furthermore, the error correction encoding and decoding endows the capability of correcting generalized disturbances to the data processing, and the security of the data processing is improved as compared to the existing encrypting scheme.

Figure 2:
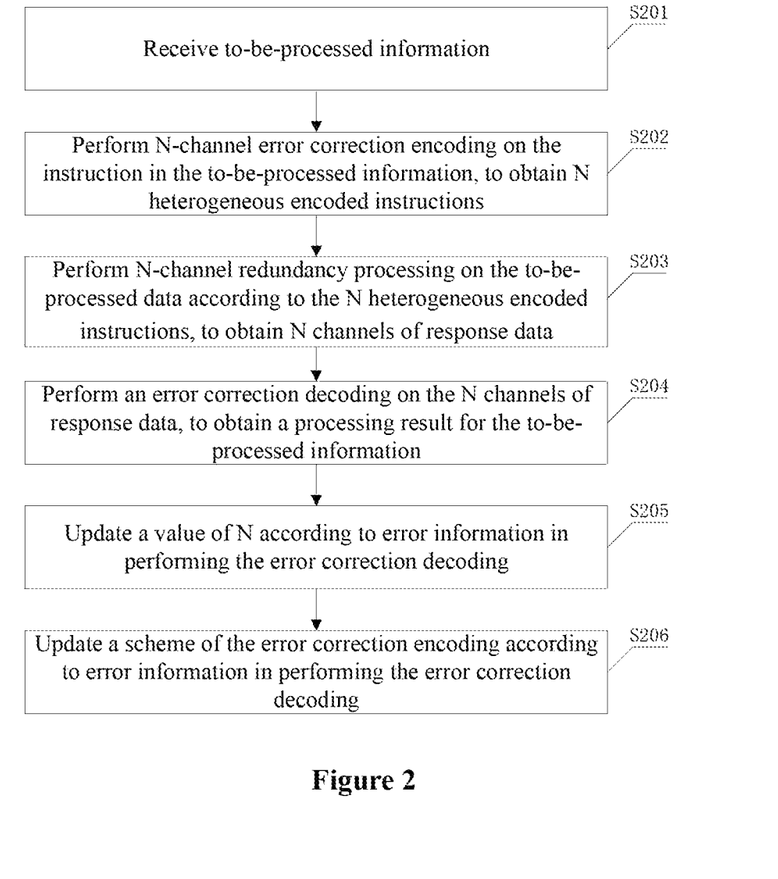
FIG. 2 is a flow chart of a data processing method based on instruction encoding according to another embodiment of the present disclosure.

FIG. 2 is a flow chart of a data processing method based on instruction encoding according to another embodiment of the present disclosure. Compared with the foregoing embodiment, steps of dynamic adjustment are added in this embodiment. The method described in this embodiment includes the following steps.

In step S201, to-be-processed information is received.

In step S202, N-channel error correction encoding is performed on an instruction in the to-be-processed information, to obtain N heterogeneous encoded instructions.

In step S203, N-channel redundancy processing is performed on to-be-processed data in the to-be-processed information according to the N heterogeneous encoded instructions, to obtain N channels of response data.

In step S204, an error correction decoding is performed on the N channels of response data, to obtain a processing result for the to-be-processed information.

In step S205, a value of N is updated according to error information in performing the error correction decoding.

Specifically, the error information includes a code word different from others, and a degree of error. The error information may be determined in any manner known in the art.

It is understandable that an example of updating the value of N is: increasing the value of N if the degree of error is high, to reduce the degree of error.

In step S206, a scheme of the error correction encoding is updated according to the error information in performing the error correction decoding.

An example of this step is: utilizing an error correction algorithm with higher error correction strength if the degree of error is high, or selecting N groups of error correction encoding algorithms with stronger heterogeneity.

It is understandable that after updating the value of N and the error correction encoding scheme, the error correction decoding scheme should be updated accordingly.

At least one of S205 and S206 is executed, and the order of S205 and S206 is not limited in the present disclosure.

In this embodiment, on the basis of redundant heterogeneous data processing, steps for dynamically adjusting the redundancy and heterogeneity are added. Thus the data processing has dynamic redundancy and heterogeneity. Therefore, randomness is further increased, and the effect of correcting disturbances is better.

It should be noted that in the above embodiments, in order to improve the security without reducing the accuracy of the result information, the principle of keeping semantics unchanged should be followed when performing the error correction encoding on the instruction in the to-be-processed information and the meta-channel programs. In other words, N-channel error correction encoding without changing semantics is performed on the instruction in the to-be-processed information, to obtain the N heterogeneous encoded instructions with semantics unchanged. Moreover, the encoded meta-channel program has the same semantics as the meta-channel program.

Unchanged semantics means that the instructions and meta-channel programs obtained by the error correction encoding do not affect the processing of the to-be-processed data. Specifically, the semantics are unchanged in two cases: the first case is that the data structure is unchanged, i.e., the type and length are unchanged; and the second case is that when the data structure is changed, the meta-channel program is changed accordingly to adapt to the change of the data structure.

In the following, the method described in the foregoing embodiments will be described in details by taking N=3 and a data processing scenario of requesting access to a certain website as an example.

Figure 3:
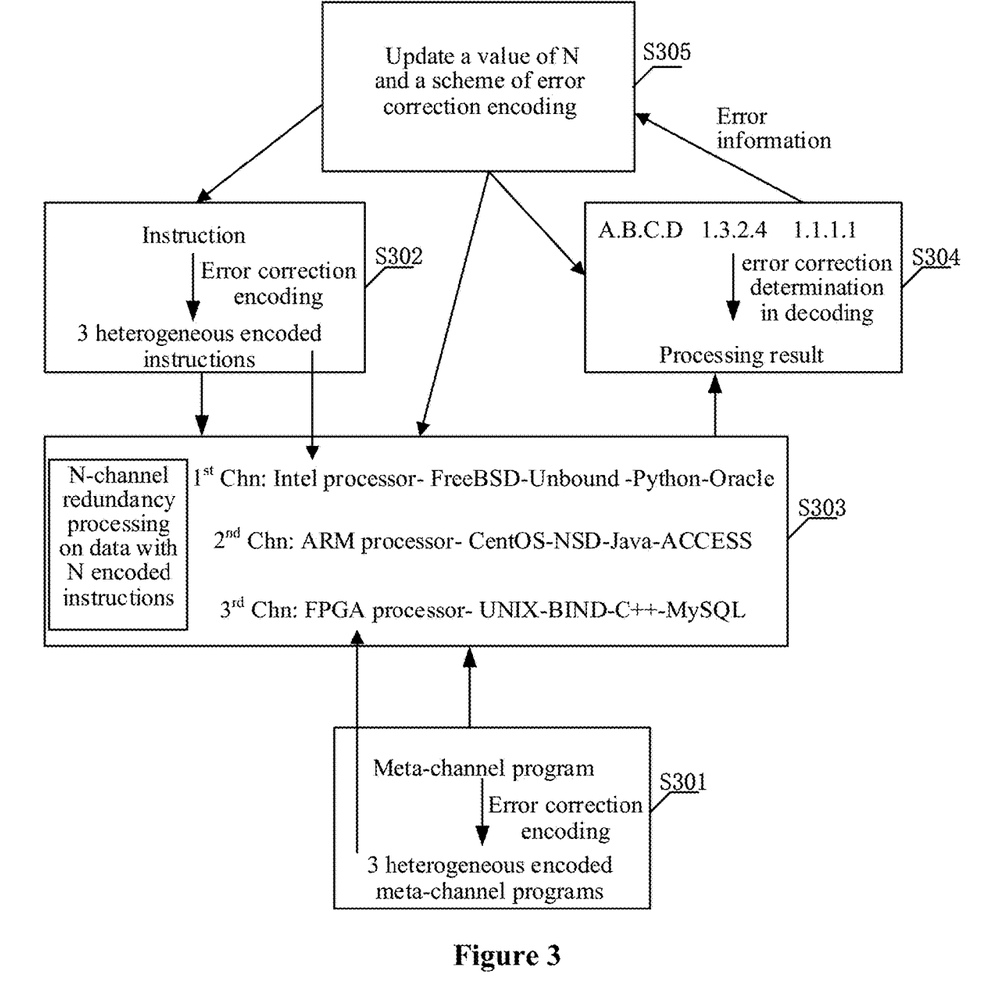
FIG. 3 is a flow chart of a data processing method based on instruction encoding according to yet another embodiment of the present disclosure.

FIG. 3 is a flow chart of a data processing method based on instruction encoding according to yet another embodiment of the present disclosure. The data processing method includes the following steps.

In step S301, an error correction encoding is performed on a pre-configured meta-channel program, to obtain three heterogeneous encoded meta-channel programs.

Specifically, in this embodiment, heterogeneous encoded meta-channel programs may be realized from different aspects.

Optionally, to achieve the heterogeneity of the three heterogeneous encoded meta-channel programs used in the three-channel processing, contents of the three heterogeneous encoded meta-channel programs used in the three-channel processing may be with at least one of the following: different signatures, different tags, different verification information, different encryption information, different scrambling schemes, different compression schemes, different transformation schemes, different compilation schemes, different instruction random tags, and different instruction sets.

Optionally, an instruction sequence of each of the three heterogeneous encoded meta-channel programs used in the three-channel processing may be with at least one of the following: randomization of a position of an instruction for realizing dynamically heterogeneous redundancy of a meta-channel operation sequence, randomization of a position of a block-level instruction, basic block diversity, probabilistic control flow integrity, diversity of structured non-overlapping codes and calling sequences, diversity of adapted m processors, diversity of adapted operating systems, diversity of adapted software protocols, diversity of adapted databases, compilation diversity, and diversity of programming languages.

The randomization of a position of a block-level instruction and the basic block diversity are for fine-grained heterogeneity. The probabilistic control flow integrity, the diversity in structured non-overlapping codes and calling sequences are for coarse-grained heterogeneity. The diversity of adapted processors, diversity of adapted operating systems, diversity of adapted software protocols, diversity of adapted databases, compilation diversity, and diversity of programming languages are for heterogeneity with the largest granularity.

Specifically, allowing i=1, 2, 3, the error correction encoding is sequentially performed on a meta-channel program pre-configured for the i-th channel of processing, to obtain an encoded meta-channel program to be used in the i-th channel of processing.

The heterogeneous error correction encoding schemes may be implemented as described above, which will not be described again herein.

In this embodiment, it is assumed that a function implemented in a meta-channel is "converting a website address into a domain name", and meta-channel data is a mapping relationship between the website address and the domain name, namely "www.abc.com--1.2.3.4". In this embodiment, an example is described with encoded meta-channel programs with heterogeneity of maximum granularity.

An encoded meta-channel program used in the first channel of processing meets the following requirements: adapting to Intel processor, adapting to FreeBSD operating system, adapting to Unbound software protocol, using Python programming language, and adapting to Oracle database.

An encoded meta-channel program used in the second channel of processing meets the following requirements: adapting to ARM processor, adapting to CentOS operating system, adapting to NSD software protocol, using Java programming language, and adapting to ACCESS database.

An encoded meta-channel program used in the third channel of processing meets the following requirements: adapting to FPGA processor, adapting to UNIX operating system, adapting to BIND software protocol, using C++ programming language, and adapting to MySQL, database.

It should be noted that the heterogeneous meta-channel programs in the above example are exemplary, and the meta-channel programs may not be heterogeneous, as long as the heterogeneity is achieved after the error correction encoding.

It is understandable that S301 can be regarded as a preprocessing for the data processing. After the preprocessing is completed, the following data processing is performed.

In step S302, after receiving to-be-processed information, a three-channel error correction encoding is performed on an instruction in the to-be-processed information, to obtain three heterogeneous encoded instructions.

In this embodiment, it is assumed that the to-be-processed information is "visit www.abc.com", in other words, the instruction is "visit", and the to-be-processed data is "www.abc.com".

Specifically, as shown in FIG. 3, the scheme of error correction encoding performed for the encoded meta-channel program in the i-th channel is performed on the instruction in the to-be-processed information, to obtain the i-th encoded instruction. In this way, the encoded instructions can be identified in the process of meta-channel, processing.

Given the encoded meta-channel programs in the above example, the encoded instructions should satisfy the following requirements.

An encoded instruction of the first channel meets the following requirements: adapting to Intel processor, adapting to FreeBSD operating system, adapting to Unbound software protocol, using Python programming language, and adapting to Oracle database.

An encoded instruction of the second channel meets the following requirements: adapting to ARM processor, adapting to CentOS operating system, adapting to NSD software protocol, using Java programming language, and adapting to ACCESS database.

An encoded instruction of the third channel meets the following requirements: adapting to FPGA processor, adapting to UNIX operating system, adapting to BIND software protocol, using C E programming language, and adapting to MySQL database.

Thus the encoded instruction of the first channel matches the encoded meta-channel program used in the first channel of processing, the encoded instruction of the second channel matches the encoded meta-channel program used in the second channel of m processing, and the encoded instruction of the third channel matches the encoded meta-channel program used in the third channel of processing.

Corresponding to the heterogeneity of the encoded meta-channel programs, in this step, heterogeneous encoded instructions may be realized from different aspects. Optionally, contents of the instructions satisfy at least one of: signature diversity, tag diversity, verification diversity, encryption diversity, scrambling diversity, compression diversity, transformation diversity, compilation diversity, instruction random tag diversity, and instruction set randomization; and/or instruction sequences satisfy at least one of: randomization of a position of an instruction for realizing dynamically heterogeneous redundancy of a meta-channel operation sequence, randomization of a position of a block-level instruction, basic block diversity, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

In step S303, N-channel redundancy processing is performed on the to-be-processed data in the to-be-processed information according to the N heterogeneous encoded instructions, to obtain N channels of response data.

Specifically, the encoded instruction of the i-th channel matches the encoded meta-channel program of the i-th channel of processing, in other words, the error correction encoding scheme used for the encoded meta-channel program of the i-th channel is the same as that used for the encoded instruction of the i-th channel.

In step S304, decoding is performed on the N channels of response data with a scheme corresponding to the scheme of the error correction encoding, to obtain N channels of data to be determined; and an error correction determination is performed on the N channels of data to be determined, to obtain the processing result.

Based on the above example, if there is no error in all three channels of processing, the decoded response data of each of the three channels is "1.2.3.4". If there is an error in the third channel of processing, the response data obtained is "1.2.3.5", and the processing result is "1.2.3.4" after the error correction determination process. Further, the processing result may be fed back to an execution device, and the execution device accesses the domain name "1.2.3.4" and displays the webpage.

In step S305, a value of N and a scheme of the error correction encoding are updated according to error information in performing the error correction decoding.

A specific scenario is taken as an example to illustrate the method shown in FIG. 3. DHR error correction encoding is performed on the data processing (computation, communication) process, thus the generalized disturbance errors in the processing results of the dynamically heterogeneous redundant meta-channels are random. And the error correction decoding is performed based on relative correctness axioms (nearest neighbor decoding/maximum likelihood decoding), resulting m higher security of the data processing.

Figure 4:
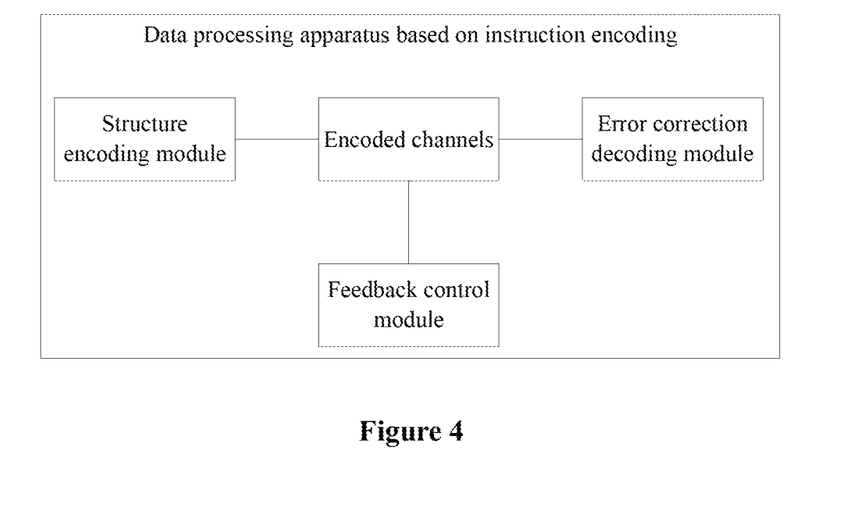
FIG. 4 is a schematic structural diagram of a data processing apparatus based on instruction encoding according to an embodiment of the present disclosure.

FIG. 4 is a schematic structural diagram of a data processing apparatus based on instruction encoding according to an embodiment of the present disclosure. The data processing apparatus based on instruction encoding includes: a structure encoding module, encoded channels, and an error correction decoding module. Optionally, the data processing apparatus may further include a feedback control module.

The structure encoding module is configured to: receive to-be-processed information, where the to-be-processed information includes an instruction and to-be-processed data; and perform N-channel error correction encoding on the instruction in the to-be-processed information, to obtain N heterogeneous encoded instructions, where N is an integer greater than or equal to 2.

The encoded channels are configured to: perform N-channel redundancy processing on the to-be-processed data in the to-be-processed information according to the N heterogeneous encoded instructions, to obtain N channels of response data; where a processing flow of any channel of the N-channel redundancy processing includes: processing the to-be-processed data in the to-be-processed information according to an encoded meta-channel program and an encoded instruction matching the encoded meta-channel program, where the encoded meta-channel program is generated by performing an error correction encoding on a pre-configured meta-channel program, pre-configured meta-channel programs for the N-channel redundancy processing implement a same function, and the encoded meta-channel programs used in the N-channel redundancy processing are heterogeneous.

The error correction decoding module is configured to: perform an error correction decoding on the N channels of response data, to obtain a processing result for the to-be-processed information.

Optionally, the feedback control module is configured to: before the structure encoding module performing the N-channel error correction encoding on the instruction in the to-be-processed information, perform an error correction encoding on a pre-configured meta-channel program in an i-th channel to obtain the encoded meta-channel program used in the i-th channel, where i=1, 2 ... N. In this case, the structure encoding module is configured to perform the error correction encoding on the instruction with a scheme same as that performed on the encoded meta-channel program in the i-th channel, to obtain the encoded instruction of the i-th channel matching the encoded meta-channel program used in the i-th channel.

Optionally, the structure encoding module is configured to: perform the N-channel error correction encoding on the instruction in the to-be-processed information without changing semantics, to obtain N semantically unchanged heterogeneous encoded instructions, where the encoded meta-channel program has the same semantics as the meta-channel program.

Optionally, the N heterogeneous encoded instructions include:
  contents with at least one of: signature diversity, tag diversity, verification diversity, encryption diversity, scrambling diversity, compression diversity, transformation diversity, compilation diversity, instruction random tag diversity, and instruction set randomization; and/or instruction sequences with at least one of: randomization of a position of an instruction for realizing dynamically heterogeneous redundancy of a meta-channel operation sequence, randomization of a position of a block-level instruction, basic block diversity, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

Optionally, the heterogeneity of encoded meta-channel programs used in the N-channel redundancy processing includes:
  contents of the N encoded meta-channel programs used in the N-channel redundancy processing satisfying at least one of: signature diversity, tag diversity, verification diversity, encryption diversity, scrambling diversity, compression diversity, transformation diversity, compilation diversity, instruction random tag diversity, and instruction set randomization; and/or
  instruction sequences of the N encoded meta-channel programs used in the N-channel redundancy processing satisfying at least one of: randomization of a position of an instruction for realizing dynamically heterogeneous redundancy of a meta-channel operation sequence, basic block diversity, randomization of a position of a block-level instruction, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

Optionally, N is a dynamic value, and the feedback control module is further configured to: update a value of N according to error information in performing the error correction decoding.

Optionally, the N heterogeneous encoded instructions include: N dynamically heterogeneous encoded instructions.

The heterogeneity of encoded meta-channel programs used in the N-channel redundancy processing includes: the N encoded meta-channel programs used in the N-channel redundancy processing being dynamically heterogeneous.

The feedback control module is further configured to: update a scheme of the error correction encoding according to error information in performing the error correction decoding. Optionally, the error correction decoding module is configured to: perform a decoding corresponding to the error correction encoding on the N channels of response data, to obtain the N channels of data to be determined; and perform the error correction determination process on the N channels of data to be determined, to obtain the processing result.

The apparatus described in this embodiment is based on the principle of dynamic redundancy and heterogeneity, and has the function of correcting generalized disturbances in the data processing process, thereby improving the security of the data processing process.

An electronic device is provided according to an embodiment of the present disclosure, including: a memory and a processor; where the memory is stored with a program, and the processor is configured to run the program to implement the forgoing data processing method based on instruction encoding.

A computer-readable storage medium with a program stored thereon is provided according to an embodiment of the present disclosure, where the program, when being executed by an electronic device, implements the foregoing data processing method based on instruction encoding.

The functions described in the method of the embodiments of the present disclosure, when implemented in the form of software functional units and sold or used as independent products, the software functional units may be stored in a storage medium readable by a computing device. Based on such understanding, the technical solutions of the disclosure, part of the disclosure that contributes to existing technologies or part of the technical solutions may be embodied in the form of a computer software product. The software product is stored in a storage medium and includes several instructions for instructing a computing device (which may be personal computer, server, mobile computing device, network device or the like) to implement all of or part of the steps of the methods according to the embodiments of the disclosure. The foregoing storage medium includes various media that can store program codes, for example, USB disk, mobile hard disk drive, Read-Only Memory (ROM), Random Access Memory (RAM), magnetic disk, optical disk and the like.

The embodiments in the present disclosure are described in a progressive manner. Each of the embodiments is mainly focused on describing its differences from other embodiments, and references may be made among these embodiments with respect to the same or similar portions among these embodiments.

Based on the above description of the disclosed embodiments, those skilled in the art are capable of carrying out or using the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A data processing method based on instruction encoding, comprising:
    receiving to-be-processed information, wherein the to-be-processed information comprises an instruction and to-be-processed data;
    performing N-channel error correction encoding on the instruction in the to-be-processed information, to obtain N heterogeneous encoded instructions, wherein N is an integer greater than or equal to 2;
    performing N-channel redundancy processing on the to-be-processed data in the to-be-processed information according to the N heterogeneous encoded instructions, to obtain N channels of response data; wherein a processing flow of any channel of the N-channel redundancy processing comprises: processing the to-be-processed data in the to-be-processed information according to an encoded meta-channel program and an encoded instruction matching the encoded meta-channel program, wherein the encoded meta-channel program is generated by performing an error correction encoding on a pre-configured meta-channel program; pre-configured meta-channel programs for the N-channel redundancy processing implement a same function, and encoded meta-channel programs for the N-channel redundancy processing are heterogeneous; and
    performing an error correction decoding on the N channels of response data, to obtain a processing result for the to-be-processed information.

2. The data processing method based on instruction encoding according to claim 1, wherein before performing the N-channel error correction encoding on the instruction in the to-be-processed information, the method further comprises:
    perform an error correction encoding on a meta-channel program pre-configured for an i-th channel of the redundancy processing, to obtain an encoded meta-channel program for the i-th channel, wherein i=1, 2 . . . N; and
    wherein the performing N-channel error correction encoding on the instruction in the to-be-processed information comprises:
        performing the error correction encoding on the instruction in the to-be-processed information with a scheme same as that performed to obtain the encoded meta-channel program for the i-th channel, to obtain an encoded instruction for the i-th channel, wherein the encoded instruction for the i-th channel matches the encoded meta-channel program for the i-th channel.

3. The data processing method based on instruction encoding according to claim 1, wherein the performing N-channel error correction encoding on the instruction in the to-be-processed information, to obtain N heterogeneous encoded instructions comprises:
    performing the N-channel error correction encoding on the instruction in the to-be-processed information without changing semantics, to obtain N semantically unchanged heterogeneous encoded instructions, wherein the encoded meta-channel program has same semantics as the meta-channel program.

4. The data processing method based on instruction encoding according to claim 1, wherein the N heterogeneous encoded instructions comprise:
    N encoded instructions having contents with at least one of: signature diversity, tag diversity, verification diversity, encryption diversity, scrambling diversity, compression diversity, transformation diversity, compilation diversity, instruction random tag diversity, and instruction set randomization; and/or
    N encoded instructions having instruction sequences with at least one of:
    randomization of a position of an instruction for realizing dynamically heterogeneous redundancy of a meta-channel operation sequence, randomization of a position of a block-level instruction, basic block diversity, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

5. The data processing method based on instruction encoding according to claim 1, wherein heterogeneity of the N encoded meta-channel programs for the N-channel redundancy processing comprises:
    contents of the N encoded meta-channel programs for the N-channel redundancy processing satisfying at least one of: signature diversity, tag diversity, verification diversity, encryption diversity, scrambling diversity, compression diversity, transformation diversity, compilation diversity, instruction random tag diversity, and instruction set randomization; and/or
    instruction sequences of the N encoded meta-channel programs for the N-channel redundancy processing satisfying at least one of: randomization of a position of an instruction for realizing dynamically heterogeneous redundancy of a meta-channel operation sequence, basic block diversity, randomization of a position of a block-level instruction, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

6. The data processing method based on instruction encoding according to claim 1, wherein N is a dynamic value, and the method further comprises:

updating a value of N according to error information in performing the error correction decoding.

7. The data processing method based on instruction encoding according to claim 1, wherein the N heterogeneous encoded instructions are N dynamically heterogeneous encoded instructions;
the N encoded meta-channel programs for the N-channel redundancy processing are dynamically heterogeneous; and
the method further comprises: updating a scheme of the error correction encoding according to error information in performing the error correction decoding.

8. The data processing method based on instruction encoding according to claim 1, wherein the performing an error correction decoding on the N channels of response data, to obtain a processing result for the to-be-processed information comprises:
decoding the N channels of response data with a scheme corresponding to a scheme of the error correction encoding, to obtain the N channels of data to be determined; and
performing an error correction determination process on the N channels of data to be determined, to obtain the processing result.

9. An electronic device comprising a memory and a processor, wherein the memory is configured to store a program, and the processor is configured to run the program to:
receive to-be-processed information, wherein the to-be-processed information comprises an instruction and to-be-processed data; and perform N-channel error correction encoding on the instruction in the to-be-processed information, to obtain N heterogeneous encoded instructions, wherein N is an integer greater than or equal to 2;
perform N-channel redundancy processing on the to-be-processed data in the to-be-processed information according to the N heterogeneous encoded instructions, to obtain N channels of response data; wherein a processing flow of any channel of the N-channel redundancy processing comprises: processing the to-be-processed data in the to-be-processed information according to an encoded meta-channel program and an encoded instruction matching the encoded meta-channel program, wherein the encoded meta-channel program is generated by performing an error correction encoding on a pre-configured meta-channel program; pre-configured meta-channel programs for the N-channel redundancy processing implement a same function, and encoded meta-channel programs used for the N-channel redundancy processing are heterogeneous; and
perform an error correction decoding on the N channels of response data, to obtain a processing result for the to-be-processed information.

10. The electronic device according to claim 9, wherein the processor is further configured to run the program to:
update a value of N according to error information in performing the error correction decoding.

11. The electronic device according to claim 9, wherein the processor is further configured to run the program to:
update a scheme of the error correction encoding according to error information in performing the error correction decoding.

12. The electronic device according to claim 9, wherein the processor is further configured to run the program to:
decode the N channels of response data with a scheme corresponding to a scheme of the error correction encoding, to obtain the N channels of data to be determined; and
perform an error correction determination process on the N channels of data to be determined, to obtain the processing result.

13. A nonvolatile computer-readable storage medium having a program stored thereon, wherein the program, when being executed by an electronic device, implements:
receiving to-be-processed information, wherein the to-be-processed information comprises an instruction and to-be-processed data; and performing N-channel error correction encoding on the instruction in the to-be-processed information, to obtain N heterogeneous encoded instructions, wherein N is an integer greater than or equal to 2;
performing N-channel redundancy processing on the to-be-processed data in the to-be-processed information according to the N heterogeneous encoded instructions, to obtain N channels of response data; wherein a processing flow of any channel of the N-channel redundancy processing comprises: processing the to-be-processed data in the to-be-processed information according to an encoded meta-channel program and an encoded instruction matching the encoded meta-channel program, wherein the encoded meta-channel program is generated by performing an error correction encoding on a pre-configured meta-channel program; pre-configured meta-channel programs for the N-channel redundancy processing implement a same function, and encoded meta-channel programs used for the N-channel redundancy processing are heterogeneous; and
performing an error correction decoding on the N channels of response data, to obtain a processing result for the to-be-processed information.

* * * * *